US006182832B1

United States Patent
Mauduit et al.

(10) Patent No.: US 6,182,832 B1
(45) Date of Patent: Feb. 6, 2001

(54) EASY-TO-ADJUST GRADER

(75) Inventors: Loren M. Mauduit, Gretna; Brent A. Ledet, Metairie; Francis Fournet, New Orleans; Scott J. Sirgo, Covington; Daniel W. Grisbaum, Westwego, all of LA (US)

(73) Assignee: The Laitram Corporate, Harahan, LA (US)

( * ) Notice: Under 35 U.S.C. 154(b), the term of this patent shall be extended for 0 days.

(21) Appl. No.: 09/243,299

(22) Filed: Feb. 2, 1999

Related U.S. Application Data

(60) Provisional application No. 60/077,271, filed on Mar. 9, 1998.

(51) Int. Cl.[7] ............................................. B07C 5/06
(52) U.S. Cl. ........................... 209/624; 209/668; 209/919
(58) Field of Search .................................... 209/621, 622, 209/623, 624, 659, 667, 668, 919

(56) References Cited

U.S. PATENT DOCUMENTS

| | | | |
|---|---|---|---|
| 2,860,779 | 11/1958 | Lindeman et al. | 209/622 |
| 2,917,170 | * 12/1959 | Flodin | 209/624 |
| 2,964,181 | 12/1960 | Demarest et al. | 209/654 |
| 3,207,309 | 9/1965 | Ernst | 209/624 |
| 3,215,270 | 11/1965 | Lacey | 209/622 |
| 3,292,784 | 12/1966 | Ernst | 209/624 |
| 3,666,092 | 5/1972 | Anderson | 209/922 X |
| 3,731,798 | 5/1973 | Anderson | 209/622 |
| 5,332,103 | 7/1994 | Zittel | 209/664 |

FOREIGN PATENT DOCUMENTS

| | | | |
|---|---|---|---|
| 662 757 | 10/1987 | (CH) . | |
| 90/01378 | * 2/1990 | (WO) | 209/622 |

OTHER PUBLICATIONS

Laitram Machinery, Inc., Product Brochure, "Model LG 30 Grader," 1997.
Laitram Machinery, Inc., Product Brochure, "Model LG 70 Grader," 1997.

* cited by examiner

*Primary Examiner*—Tuan N. Nguyen
(74) *Attorney, Agent, or Firm*—James T. Cronvich

(57) ABSTRACT

An easily adjustable grader for sizing and sorting food products, especially shellfish such as shrimp. The grader includes a series of parallel rotating rollers attached at either end to drive chains. The drive chains include adjustment levers attached rotatably at each roller position. The levers have a first arm terminating in a rolling wheel and a second arm whose end conforms to the chain. An adjustment rail is positioned above each chain along the length of the grader. The wheels of the levers ride along cam surface on the underside of the rail. Rail adjusters at each end of the rail raise and lower each end of the rail to change the spacing between the cam surface and the chain along the length of the grader. The pressure exerted by the cam surface on the lever causes the chain to kink in proportion to the distance between the cam surface and the chain, which adjusts the gap between consecutive rollers. The widths of the gaps determine the size gradations of the grader.

16 Claims, 3 Drawing Sheets

EASY-TO-ADJUST GRADER

CROSS-REFERENCE TO RELATED APPLICATIONS

This application claims the benefit of U.S. Provisional application Ser. No. 60/077,271, filed Mar. 9, 1998.

BACKGROUND

The invention relates to processing food products generally and, more particularly, to apparatus for grading and sorting shellfish, such as shrimp, by size.

In the food processing industry, particularly the shrimp processing industry, a premium is paid for larger shrimp. Consequently, it is common practice to sort shrimp according to size. Various grading devices are used to sort shrimp. One type is a rolling conveyor grader, which includes a series of parallel rollers rotatably connected at each end to the links of an endless chain. A motor and gears drive the chain and the rotating rollers along a path including an upper grading path and a lower return path. Grading is achieved by adjusting the spacing between the rollers on the grading path from narrow where the product enters to wide at the other end. The smaller shrimp drop between the narrow gaps nearer the entry end, with increasingly larger shrimp dropping off further along the grading path as the gaps increase in width. Dropping product is typically collected below by one or more conveyor belts.

These rolling conveyor graders have some shortcomings. For example, in some graders, the grading sizes are fixed by the manufacturer and cannot be easily adjusted by the user to adapt to a change in the range of product sizes. Adjustable graders are available, but they typically require a separate adjustment for each size, or grade, and the number of grades is limited to the number of adjustments provided.

Thus, there is a need for an adjustable grader that minimizes the number of adjustments a user must make, while providing a large number of grades.

SUMMARY

These needs and others are provided by an improved grading apparatus having features of the invention. The improvement includes a single adjustment rail at each side of the roller conveyor cooperative with each chain. The adjustment rail has a bottom cam surface along which the wheels of adjustment levers roll. A tensioning bar is attached to the adjustment rail to maintain the rigidity of the rail. The levers are pivotally attached to the chain at each roller position. Rail adjusters at each end of the adjustment rail allow the user to raise or lower the ends of the rails in tandem. By adjusting the two ends of the rails, the spacing between the cam surface and the chain can be controlled along the grading path. With the cam surface close to the chain, the adjustment levers cause the chain by lever action to kink, which closes the gap between consecutive rollers. Because the adjustment is at the two ends of the rail, the spacing can be adjusted to provide a linearly increasing distance between the chain and the cam surface for a continuously increasing spacing between consecutive rollers along the grading path. In this way, two adjustments can be used to adjust the grading range of the apparatus.

DRAWINGS

These and other features, aspects, and advantages of the invention are better understood by reference to the following description, appended claims, and accompanying drawings, in which:

DESCRIPTION

Figure 1:
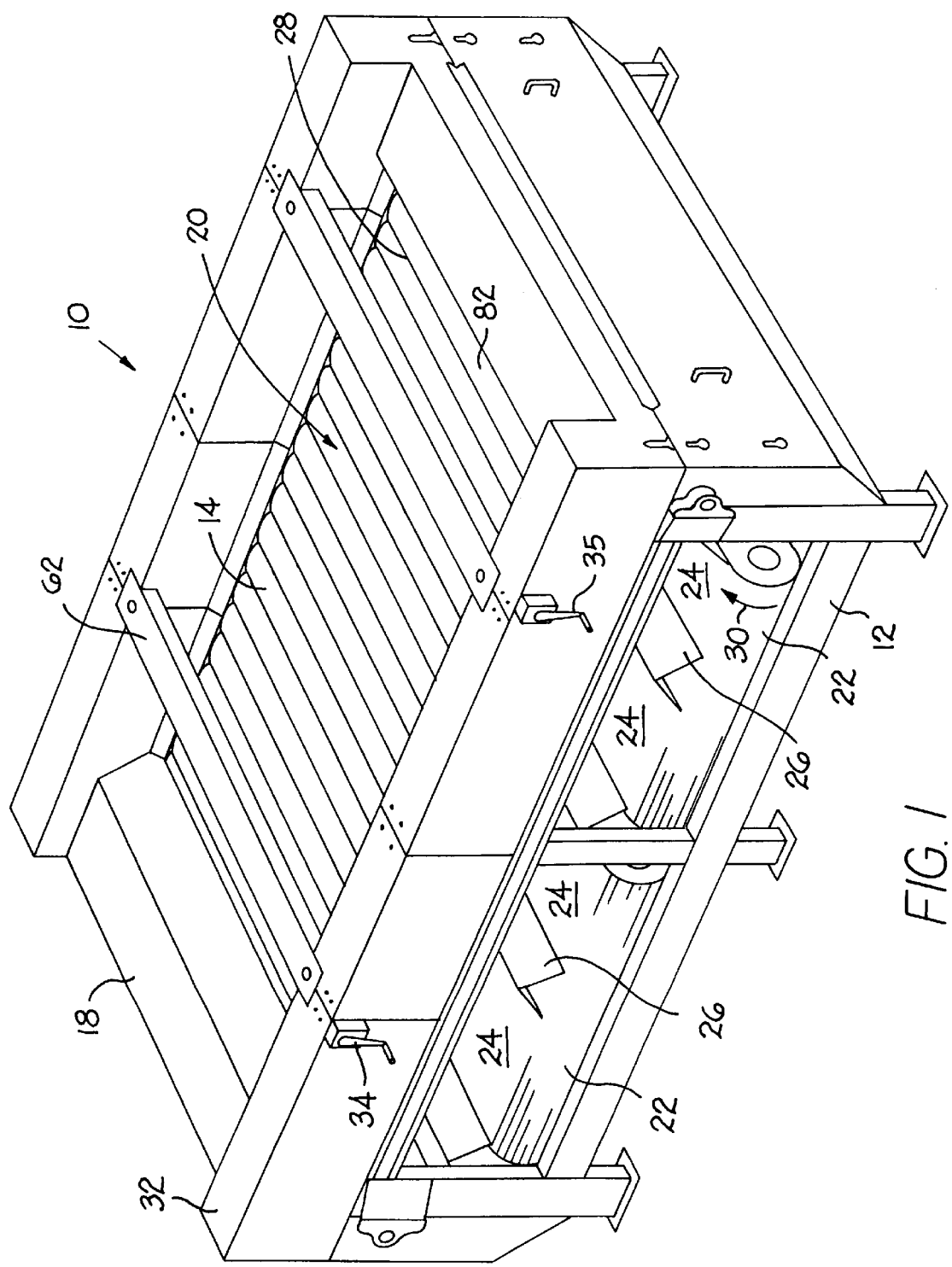
FIG. 1 is a top perspective view of an adjustable roller conveyor grader embodying features of the invention.

An exemplary version of an adjustable grader 10 embodying features of the invention is shown in FIGS. 1–4. The grader is supported by a frame 12 and includes a plurality of parallel rollers 14 attached at each end to a chain 16 supported by a chain rail 17. The chains at each side are driven continuously by a means of a conventional motor-driven sprocket (not illustrated). Shrimp or other food products are fed into the entrance end 18 of the grader along its upper grading path 20 and are carried along by the rotating rollers. The endless chains return the rollers along a lower returnway (not shown). Positioned between the grading path and the returnway are one or more takeaway belts 22. The belts are divided into channels 24 for each gradation by dividers 26. The takeaway belts receive the graded product that drops from gaps 28 between the rollers. The belts are conventionally driven in the direction of arrow 30 to transport the graded product to downline processing stations. Extending from the outer side of a side housing 32 is a first adjustment crank 34 and a second adjustment crank 35. The cranks, as described in more detail later, adjust the gaps between the rollers for the desired range of grading.

Figure 2:
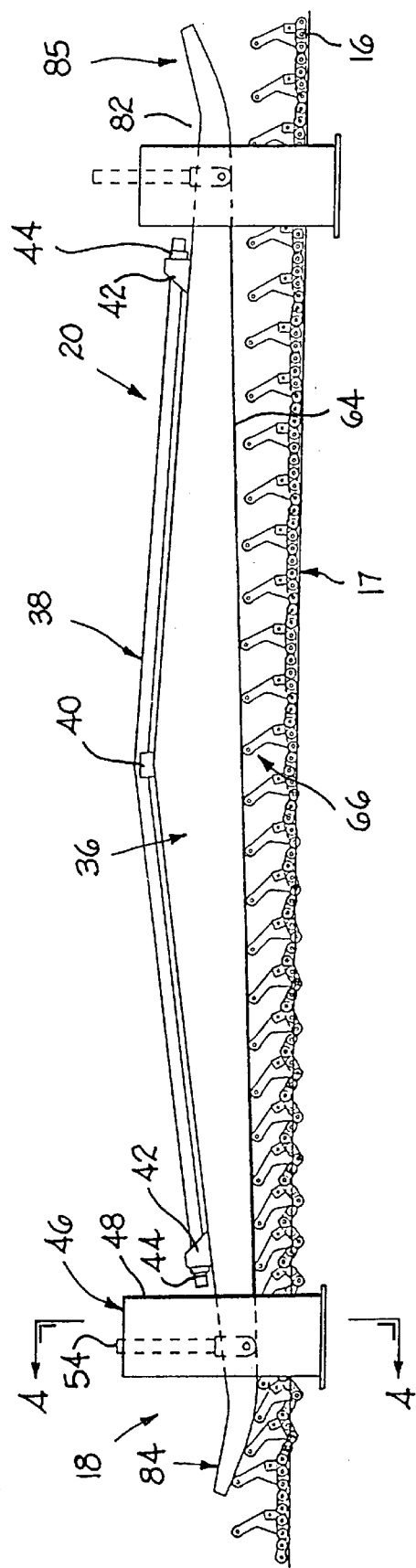
FIG. 2 is a side elevation view of the grading path of the roller conveyor of FIG. 1, showing the adjustment of the roller spacing.
Figure 3:
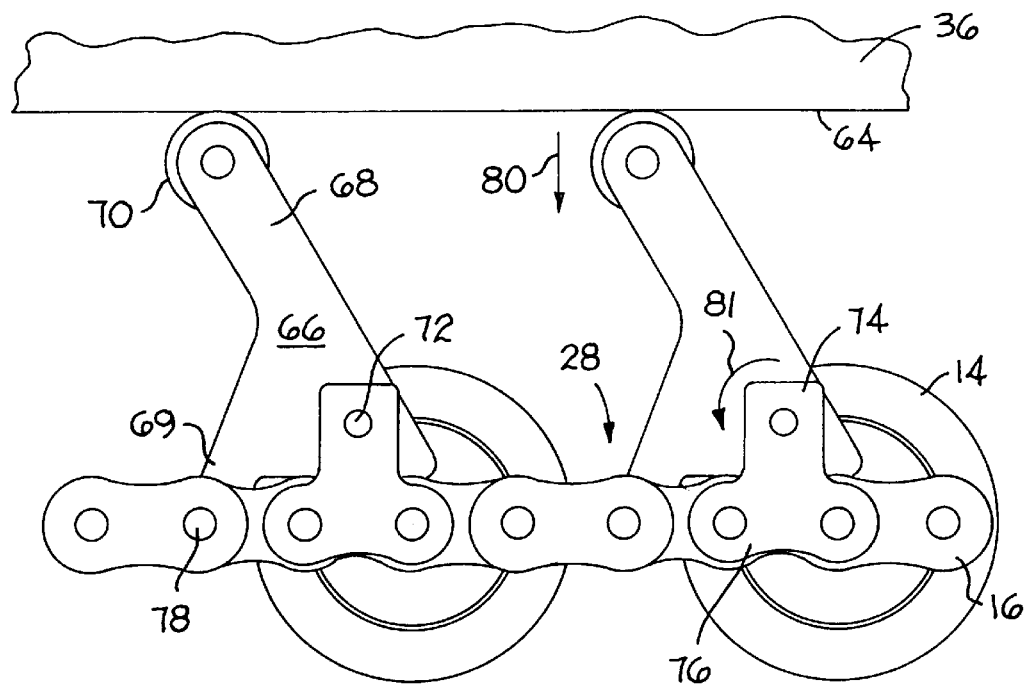
FIG. 3 is a side elevation view of the adjustment lever of the adjustable roller conveyor of FIG. 1.

As shown better in FIG. 2, the side housing covers an adjustment rail 36 extending substantially the length of the grading path. The rail is pre-tensioned by a tensioning bar 38 supported in the middle by a brace 40 and at each end by brackets 42. Nuts 44 at the outside of the brackets are used to tighten the tension bar to pre-tension the adjustment rail to maintain the rigidity and precise position of the rail 36. A rail adjuster 46 at each end of the rail includes a pedestal 48 supporting the crank 34, 35 and its gear mechanism. The adjustment rail is made of a sturdy material, such as stainless steel, and preferably includes a sloping entrance portion 84 for snagless entry of adjustment levers 66. The opposite end 85 of the rail could be similarly shaped for symmetry and manufacturability.

Figure 4:
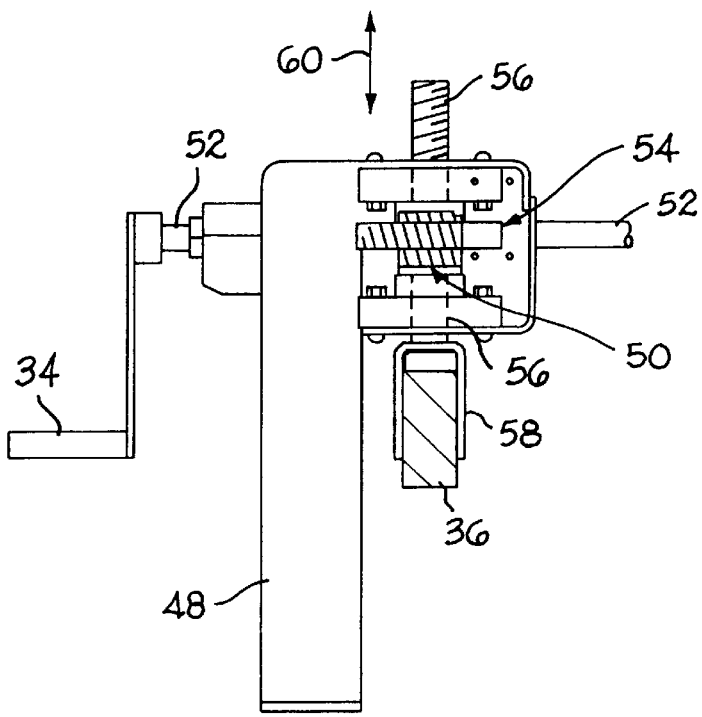
FIG. 4 is a section view of the rail adjuster of FIG. 2, taken along section lines 4—4.

As shown in FIG. 4, the mechanism includes a worm 50 keyed to a shaft 52 attached at one end to the crank 34, 35 and extending across the grader to the other side where it is supported by a similar rail adjuster mechanism to raise and lower the other rail. The worm meshes with a worm gear 54 having a threaded central bore threadedly engaging a threaded rod 56 attached at its lower end to a truss bracket 58 attached to the rail 36. As the crank is turned, it rotates the shaft 52, which rotates the worms on each side of the grader. The worm causes the worm gear to rotate. Because the worm gear is held in position in the pedestal, its rotation causes the threaded rod to move vertically in the direction of two-headed arrow 60 to raise or lower the rails on both sides of the conveyor. (The shaft is covered by a shaft housing 62.)

Raising and lowering the rail affects the gap 28 between consecutive rollers 14. The bottom of the adjustment rail forms a flat cam surface 64. Adjustment levers 66 include, at the end of an upper arm 68, a wheel 70 that rolls along the cam surface. As shown in detail in FIG. 3, the lever is pivotally attached by a pin 72 serving as a fulcrum. The pin extends between a pair of tabs 74 extending upward from opposite chain links 76. A lower arm 69 of the lever conforms to the shape of the passage for the chain's pintle 78. Pressure exerted in the downward direction 80 causes the lever to rotate about its fulcrum as shown by arrow 81, and for the lower arm to depress the chain and close the gap between consecutive rollers 14.

As shown in FIG. 2, lowering the adjustment rail 36 at the entrance end 18 pushes the levers down to kink the chain 16 and close the gaps 28 between consecutive rollers 14. With the rail adjusted to a relatively higher position at the opposite end 82 of the grading path, the pressure on the levers decreases along the grading path, the chain straightens, and the gaps increase toward the opposite end. In this way the gaps increase monotonically with distance along the grading path according to the angle of the cam surface relative to the chain path. Shrimp carried along the grading path by the rotating rollers fall through the gaps that are wide enough for their particular size to the takeaway belt below. There is no restriction to one size per adjustment as in other graders.

Thus, through the use of just two cranks, the adjustment rails can be raised and lowered at both ends of the grading path to desired levels to adjust the angle of the rail and its offset at each end. By this adjustment, both the range and granularity of the spacing between consecutive rollers can be set for an easy and flexible adjustment of grading sizes for various product characteristics.

Although the invention has been described in detail with reference to a preferred version having at least the advantages mentioned, other versions are possible. For example, cranks could be attached at one or both sides of the grader. As another example, one end of the rail could be rotatably attached to the frame a fixed distance above the chain without adjustment. In such a version, adjustment would be accomplished at just one end with some loss in flexibility of adjustment range. Therefore, the spirit and scope of the claims should not be limited to the description of the embodiment described here in detail.

What is claimed is:

1. An easy-to-adjust grader for food products, comprising:
   a frame;
   a roller conveyor supported by the frame, including:
      a plurality of parallel rollers having gaps between consecutive rollers;
      a pair of endless chains at each side of the rollers, the rollers being attached rotatably between the chains;
      means for driving the chains along a grading path;
      a plurality of adjustment levers pivotally attached to the chains, each of the adjustment levers having a first arm terminating in a rotatable wheel and a second arm bearing against the chain;
   an adjustment rail supported by the frame and extending substantially the length of the grading path above one of the chains and including a lower cam surface;
   a tensioning bar attached to the adjustment rail to maintain the rigidity of the adjustment rail; and
   a rail adjuster attached to the frame and cooperative with a first end of the adjustment rail to raise and lower the rail at the first end to adjust the angle of the cam surface relative to the chain, wherein the wheels of the levers roll along the cam surface and force the chain to kink in accordance with the distance between the cam surface and the chain to adjust the width of the gaps between consecutive rollers according to the angle of the cam surface.

2. A grader as in claim 1, further comprising a second rail adjuster at an opposite second end of the adjustment rail.

3. A grader as in claim 1, wherein the rail adjuster comprises a crank mechanism to manually raise and lower the rail at the first end.

4. A grader as in claim 1, further comprising a second adjustment rail supported by the frame above the other of the chains.

5. A grader as in claim 4, wherein the rail adjuster cooperates with the first ends of both adjustment rails to raise and lower the rails in tandem.

6. An easy-to-adjust grader for food products, comprising:
   a frame;
   a roller conveyor supported by the frame, including:
      a plurality of parallel rollers having gaps between consecutive rollers;
      an endless chain at a side of the rollers, the rollers being attached rotatably to the chain;
      means for driving the chain along a grading path;
      a plurality of adjustment levers pivotally attached to the chain, each of the adjustment levers having a first arm and a second arm bearing against the chain;
   an adjustment rail supported by the frame and extending substantially the length of the grading path above the chain and including a lower cam surface engaging the first arms of the adjustment levers;
   a tensioning bar attached to the adjustment rail to maintain the rigidity of the adjustment rail; and
   a rail adjuster attached to the frame and cooperative with the adjustment rail to adjust the angle of the cam surface relative to the chain by forcing the first arms of the adjustment levers to kink the chain according to the angle between the cam surface and the chain to adjust the width of the gaps between consecutive rollers.

7. A grader as in claim 6, wherein the end of the first arm of the adjustment levers terminates in a roller that engages the cam surface in rolling contact.

8. A grader as in claim 6, wherein the rail adjuster comprises a crank to raise and lower the adjustment rail to change the angle between the cam surface and the chain.

9. A grader as in claim 6, wherein the cam surface of the adjustment rail includes a sloping entrance portion to avoid snagging the adjustment levers.

10. A grader as in claim 6, further comprising another endless chain at the opposite side of the rollers, the rollers being rotatably attached between the chains, with adjustment levers pivotally attached to both chains and an adjustment rail supported above each chain.

11. A grader as in claim 10, comprising rail adjusters disposed at opposite ends of each of the adjustment rails to raise and lower the ends of the adjustment rails.

12. A grader as in claim 11, further comprising a shaft connected between rail adjusters associated with opposing adjustment rails to permit both rails to be adjusted in tandem from either side of the grader.

13. A grader as in claim 6, further comprising a threaded rod connected to the adjustment rail and wherein the rail adjuster includes a crank and an interconnected worm gear engaging the threaded rod to raise and lower the adjustment rail as the crank is turned.

14. An easy-to-adjust grader for food products, comprising:
   a frame;
   a roller conveyor supported by the frame, including:
      a plurality of parallel rollers having gaps between consecutive rollers;
      a pair of endless chains at each side of the rollers, the rollers being attached rotatably between the chains;

means for driving the chains along a grading path;

a plurality of adjustment levers pivotally attached to the chains, each of the adjustment levers having a first arm terminating in a rotatable wheel and a second arm bearing against the chain;

a pair of adjustment rails supported by the frame and extending substantially the length of the grading path from a first end to a second end above each of the chains, each of the rails including a lower cam surface;

a pair of tensioning bars, each threadedly attached to a respective one of the adjustment rails to maintain the rigidity of the adjustment rails; and rail adjusters attached to the frame and cooperative with the first and second ends of the adjustment rails to raise and lower the rails at the first and second ends to adjust the angle of the cam surfaces relative to the chains, wherein the wheels of the levers roll along the cam surfaces and force the chains to kink in accordance with the distance between the cam surfaces and the chains to adjust the width of the gaps between consecutive rollers according to the angles of the cam surfaces.

15. A grader as in claim 14, wherein the rail adjusters each comprise a crank for manually adjusting the widths of the gaps between consecutive rollers.

16. A grader as in claim 14, further comprising a shaft disposed at each of the first and second ends of the rails and operatively connecting the rail adjusters of opposite rails to each other to provide adjustment of both rails from either side of the grader.

* * * * *